(12) United States Patent
Magens et al.

(10) Patent No.: US 8,919,472 B2
(45) Date of Patent: Dec. 30, 2014

(54) INDUSTRIAL TRUCK COMPRISING A BATTERY RECEIVING SPACE

(75) Inventors: Ernst-Peter Magens, Ammersbek (DE); Jörn Sellentin, Kaltenkirchen (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 47 days.

(21) Appl. No.: 13/212,548

(22) Filed: Aug. 18, 2011

(65) Prior Publication Data
US 2012/0048629 A1 Mar. 1, 2012

(30) Foreign Application Priority Data
Aug. 26, 2010 (DE) .......................... 10 2010 035 553

(51) Int. Cl.
*B66F 9/06* (2006.01)
*B60R 16/04* (2006.01)
*B66F 9/075* (2006.01)
*B66F 9/065* (2006.01)

(52) U.S. Cl.
CPC ............... *B66F 9/065* (2013.01); *B66F 9/0754* (2013.01)
USPC ........................................ 180/68.5; 180/65.1

(58) Field of Classification Search
USPC ................................................ 180/68.5, 65.1
See application file for complete search history.

(56) References Cited

U.S. PATENT DOCUMENTS

| 5,036,938 | A * | 8/1991 | Blount et al. ................. 180/208 |
| 2004/0144580 | A1 * | 7/2004 | Wu ............................. 180/68.5 |

FOREIGN PATENT DOCUMENTS

| DE | 19956653 | 5/2001 |
| DE | 102005008061 | 8/2006 |
| DE | 102007034743 | 1/2009 |
| DE | 102007054258 | 5/2009 |
| DE | 202009009367 | 9/2009 |
| EP | 2261167 | 12/2010 |
| JP | 2001316090 | 11/2001 |

OTHER PUBLICATIONS

"Volle Ladung" In: Logistik-Journal, Feb. 2005, S. 18, 19.

* cited by examiner

*Primary Examiner* — J. Allen Shriver, II
*Assistant Examiner* — Erez Gurari
(74) *Attorney, Agent, or Firm* — Vidas, Arrett & Steinkraus (57) ABSTRACT

Industrial truck with a drive part which comprises an electrical travel drive, a load part which comprises a load carrying means and which may be lifted relative to the drive part, a battery receiving space and an energy module which may be handled manually, which may be inserted into the battery receiving space and which comprises a battery for supplying power to the travel drive, the energy module having a defined installed position in the state inserted into the battery receiving space, the battery receiving space enclosing the energy module in the inserted state so that the energy module is not displaceable in the defined installed position but may only be removed from the battery receiving space after being tilted, during the tilting process an upper end of the energy module being moved by a predetermined angle about a horizontal pivot axis.

14 Claims, 5 Drawing Sheets

INDUSTRIAL TRUCK COMPRISING A BATTERY RECEIVING SPACE

CROSS-REFERENCE TO RELATED APPLICATIONS

Not applicable

STATEMENT REGARDING FEDERALLY SPONSORED RESEARCH

Not applicable

BACKGROUND OF THE INVENTION

The invention relates to an industrial truck with a drive part which comprises an electrical travel drive, a load part which comprises a load carrying means and which may be lifted relative to the drive part, a battery receiving space and an energy module which may be handled manually, which may be inserted into the battery receiving space and which comprises a battery for supplying power to the travel drive, the energy module having a defined installed position in the state inserted into the battery receiving space.

Electrically driven industrial trucks are provided with batteries, the capacity thereof being dimensioned so that the industrial truck may be operated for a specific time with a fully charged battery independently of a power supply, for example for the duration of a shift of an industrial truck which is operated in shifts. Subsequently, the batteries are more or less fully discharged so that recharging is required. If the industrial truck is intended to be ready for use soon after, the discharged battery may be replaced by a fully charged battery. In order to simplify this, it is known to insert the battery in a battery receiving space. Batteries of conventional construction (lead accumulators) with the required capacity are frequently so heavy that a hoist is required for the replacement thereof. Batteries of smaller capacity or newer technology, in particular lithium-ion-accumulators, however, may be handled manually.

A low-lift truck comprising a battery compartment for receiving a battery is disclosed in the publication DE 10 2007 034 743 A1 the entire contents of which is incorporated herein by reference. The battery receiving space encloses the battery partially to the side and at the bottom and has a wall facing the battery with slot-shaped recesses. Guide pins arranged on the rear face of the battery engage in these recesses when the battery is inserted from above into the battery receiving space. For removal, the battery is pulled upwards out of the battery receiving space.

It is also known to insert a battery from the side into a battery receiving space of an industrial truck. To this end, the publication DE 199 56 623 A1 the entire contents of which is incorporated herein by reference discloses a battery with rollers attached to the side, which roll on rails on the inner faces of the battery receiving space.

Proceeding therefrom, it is the object of the invention to provide an industrial truck according to the preamble of Claim 1, in which the energy module comprising the battery may be replaced particularly easily and at the same time is held securely in the battery receiving space.

This object is achieved by the industrial truck having the features of Claim 1. Advantageous embodiments are set forth in the accompanying sub-claims. The industrial truck has a drive part which comprises an electrical travel drive, a load part which comprises a load carrying means and which may be lifted relative to the drive part, a battery receiving space and an energy module which may be handled manually, which may be inserted into the battery receiving space and which comprises a battery for supplying power to the travel drive, the energy module having a defined installed position in the state inserted into the battery receiving space. The battery receiving space encloses the energy module in the inserted state so that the energy module is not displaceable in the defined installed space but may only be removed from the battery receiving space after being tilted, during the tilting process an upper end of the energy module being moved by a predetermined angle about a horizontal pivot axis.

The industrial truck may be a low-lift industrial truck. It may be a pedestrian truck, in particular a drawbar-guided industrial truck. However, it may also be a ride-on vehicle or a vehicle with an operator platform in which an operator can travel along standing upright. The electrical travel drive has an electric motor, a drive wheel and optionally a gearbox. The drive wheel may be designed to be steerable, in particular by means of a drawbar. A steering drive may be present.

The energy module has a battery for supplying power to the travel drive. Further electrical consumers of the industrial truck may also be supplied with power, for example a steering drive. In particular, all further electrical consumers may be supplied with power from the battery. The energy module may contain a plurality of cells of a battery and have a housing in which the cells are accommodated. The energy module may be handled manually, i.e. lifted by an operator without a separate hoist and inserted into the battery receiving space. The defined installed position which the energy module adopts in the battery receiving space is predetermined by the dimensions of the battery receiving space and of the energy module being adapted to one another. For example, the energy module may be substantially cuboidal and held upright in the battery receiving space.

BRIEF SUMMARY OF THE INVENTION

According to the invention, the energy module is not displaceable in the defined installed position, i.e. it may not be moved in its entirety in any spatial direction. In particular, the position of the energy module is fixed by the battery receiving space relative to the principal loading direction in which, for example, impacts and vibrations act, predominantly when travelling over uneven surfaces. These principal loads are absorbed by the battery receiving space without specific fastening of the energy module being required therefore.

Due to the specific design of the battery receiving space, the energy module in its installed position is enclosed so that, starting from the defined installed position, an upper end of the energy module may be tilted about a horizontal pivot axis. The battery module can only be completely removed from the battery receiving space, for example in a predetermined direction in which it may be pulled out by a user, after this tilting movement has been performed to a predetermined angle.

In order to insert the energy module into the battery receiving space, a reverse movement sequence has to be adhered to. The energy module is thus moved into a defined intermediate position in which it is tilted relative to the defined installed position by the predetermined angle about the pivot axis. After reaching this intermediate position, the upper end of the energy module is tilted by the predetermined angle about the pivot axis in the opposite direction of the tilting movement performed during removal and as a result reaches the defined installed position.

The pivot axis may be located in a lower region of the energy module. It may be predetermined by guide elements on the energy module, which cooperate with mating pieces on the battery receiving space. It is also conceivable that the battery receiving space has a pivotable surface, against which the energy module abuts, and/or a pivotable receiver into which the energy module is inserted. In a particularly simple solution, the pivot axis coincides with a lower edge of the energy module, the edge in the illustrated intermediate position, for example, bearing against a surface of the battery receiving space, in particular a base of the battery receiving space and the energy module being tilted upright on this edge.

The movement to be carried out when inserting and removing the energy module may be substantially predetermined by the battery receiving space so that the movement sequence may be performed very easily. At the same time, the energy module in its defined installed position is particularly securely held and is not able to slip out of the battery receiving space in any spatial direction, for example as a result of vibrations. Therefore, a particularly simple and secure replacement of the energy module is achieved.

In one embodiment, the energy module has a handle at the upper end. The energy module may be easily gripped by the handle and, for example, carried to a charging station. The tilting movement to be performed for removing and/or inserting the energy module may, in particular, be carried out by a lateral movement of the handle, in particular by pulling the handle towards a user. The handle may, for example, be stirrup-shaped and protrude upwardly from an upper surface of the energy module.

In one embodiment, the energy module has a housing and the handle is integrated in a contour of the housing so that it does not protrude outwards over the housing. For example, the housing may have a grip recess which surrounds a grip portion of the handle to be gripped, to the side and to the bottom. The grip portion may terminate flush with an upper edge of the housing of the energy module or, in particular, form an upper lateral edge of the housing. A handle integrated in this manner into the housing may be gripped easily, damage to the battery module by an impact on the handle being avoided during operation of the industrial truck.

In one embodiment, the battery receiving space has a base, a rear wall, two side walls and an upper wall, the energy module in the defined installed position standing on the base and having a curved upper contour which is in contact with the upper wall. The curved upper contour may, in particular, be formed by an upper edge of the side walls. The rear wall and the two side walls and the upper wall may in the defined installed position be directly adjacent to the energy module, so that displacement of the energy module is not possible in the corresponding directions. The curved upper contour of the energy module may have a radius of curvature which substantially corresponds to the distance of the contour from the pivot axis. As a result, the curved upper contour may slide along the upper wall or part of the surface or the edge of the upper wall when the energy module is tilted. At the same time, the energy module in its defined fitted position is hindered from being displaced upwards by the upper wall. The upper wall may extend only over a portion of the energy module in the direction of the movement of the upper end of the energy module carried out during the tilting process. The upper wall may, for example, be designed to be strip-shaped and as a planar surface.

In one embodiment, the battery receiving space has a stop which cooperates with a mating piece on the energy module and limits the tilting movement when the predetermined angle is reached. By means of the stop, the removal of the energy module is further simplified as it is immediately sensed when the tilting movement is terminated. Moreover, the stop may also simplify the insertion of the energy module, as the energy module may be moved easily into the aforementioned intermediate position in which it bears against the stop. In this case, the stop may be formed as a guide, for example, for inserting the energy module into the intermediate position. The stop may be formed, for example, by a front wall of the battery receiving space which is arranged on the side of the energy module opposing the rear wall. The front wall may be arranged to be inclined by the predetermined angle relative to the rear wall. The front wall may extend over only part of the height of the receiving space. The front wall may, for example, be formed by a planar strip which is adjacent to the base of the battery receiving space.

In one embodiment, the battery receiving space is integrated in the drive part. As a result, a relative movement which exerts stress on the electrical connection between the energy module and the travel drive when carrying out the lifting function is avoided. Moreover, the energy module does not have to lifted therewith which leads to a reduction in the energy consumption for the lifting function. Moreover, when integrated in the drive part the battery receiving space, which is generally located on the side of the drive part, may be particularly easily accessible for a user. Additionally, the battery receiving space and the energy module are protected from damage by a load received by the load carrying means.

In one embodiment, at least one side surface of the energy module and/or an upper surface of the energy module in the defined installed position is visible from outside and terminates substantially flush with an adjacent outer surface of a housing of the industrial truck. The housing of the industrial truck may, in particular, be the housing of the drive part. In other words, a surface portion of an outer contour of the industrial truck is formed by the housing of the energy module. This may contribute to the reduction in weight of the industrial truck and further simplify the replacement of the energy module, as before removing the energy module, no element of the housing of the industrial truck has to be opened, for example swung open.

In one embodiment, during operation the industrial truck has a surface facing an operator, which is adjacent to the battery receiving space, and the energy module is tilted in the direction of the operator. This arrangement of the battery receiving space is particularly advantageous ergonomically. Based on the usual operating position, a user may easily remove the energy module by pulling the upper end of the energy module towards him/her, in particular by using a handle attached at that point. In other words, the upper end of the energy module is tilted away from the surface adjacent to the battery receiving space.

In one embodiment a locking device is provided which prevents tilting of the energy module. By means of the locking device, the energy module is additionally secured in its defined installed position. For example, the locking device may be held by a spring in a locked position and have an actuation element by which the locking may be released counter to the spring force. Such a locking element may automatically adopt and maintain its locked position after inserting the energy module. The locking device may have a latching element which engages in an opening of the battery receiving space, in particular in an opening in the upper wall of the battery receiving space. This produces simple and reliable automatic locking. In combination with the battery receiving space which already fixes the position of the energy module against displacement, in particular in the principal loading direction, the locking system merely has to block a possible tilting movement solely in the defined installed position. The locking system may be dimensioned, therefore, for smaller loads.

In one embodiment, the locking device has an actuation element which is arranged so that it may be actuated by the hand gripping the handle when the handle is gripped. As a result, in particular, unlocking may be carried out using the same hand with which the energy module is intended to be removed. The removal of the battery module is, as a result, further simplified and may be carried out, in particular, by means of a single, fluent hand movement. The actuation element may, for example, be a push button which is arranged so that it may be pressed with one finger of the hand encompassing the handle, in particular the middle finger. Alternatively, the actuation element and the handle may configured in one piece. For example, the handle may be configured to be rotatable, the locking device being actuated and/or unlocked by turning the handle. Alternatively, the handle may be guided displaceably in the energy module for actuating the locking device, so that it may be pressed down, for example, for unlocking.

In one embodiment, resiliently pretensioned contacts are arranged on the energy module or in the battery receiving space and which, when inserting the energy module, automatically produce an electrical connection between the energy module and the industrial truck. In principle, the electrical connection may also be created manually, for example by a plug connection. Also, a plug connection may be used which has the resiliently pretensioned contacts. A particularly reliable contact is achieved with contacts which have contact bodies which are movably guided in a base body in their longitudinal direction and in each case are subjected to a force by a spring in the longitudinal direction. The contact bodies are arranged so that they are pressed in the defined installed position with sufficient force against corresponding contact surfaces on the energy module and/or in the battery receiving space. For example, the contacts may be arranged on the base of the battery receiving space and connected to the travel drive, in particular a motor control unit. In this case, on the underside of the energy module corresponding contacts may be arranged which come into contact with the contact bodies in the defined installed position. The contacts may be arranged so that the movement to be carried out for opening and closing the contacts extends in the above-mentioned principal loading direction, in particular in a substantially vertical direction. Inadvertent opening of the contacts is thus reliably prevented by the battery receiving space, by fixing the installed position.

In one embodiment, the energy module has a battery management system and for producing an electrical connection for data exchange between said battery management system and the industrial truck, further resiliently pretensioned contacts are arranged on the energy module or in the battery receiving space which, when inserting the energy module, automatically produce an electrical connection between the energy module and the industrial truck. The battery management system serves for monitoring the battery, in particular the charged state of the battery. In addition to data exchange with the industrial truck, data exchange is possible with a charging unit or a charging station. The battery management system with the automatic contact represents a simple possibility for monitoring the battery.

In one embodiment, a charging station is present which has a battery receiving space which is the same as the battery receiving space of the industrial truck. As a result, the energy module is also able to be particularly easily inserted into the charging station and/or removed therefrom. Thus automatic contact may be ensured, as in the battery receiving space of the industrial truck. Thus also the recharging process is simplified.

BRIEF DESCRIPTION OF THE SEVERAL VIEWS OF THE DRAWINGS

The invention is described in more detail hereinafter with reference to exemplary embodiments shown in the figures, in which.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

In all the figures the same reference numerals are used for corresponding parts.

Figure 1:
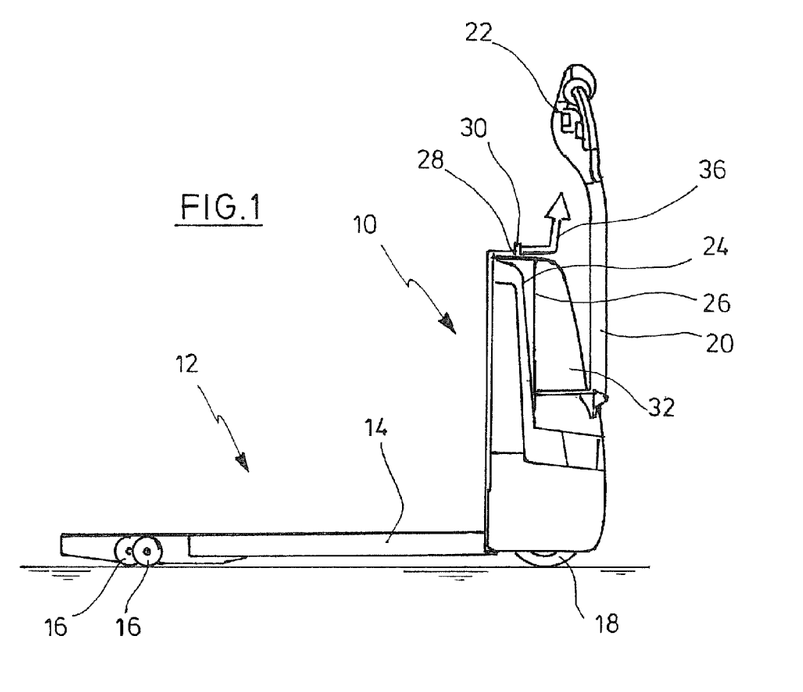
FIG. 1 shows an industrial truck according to the invention in a view from the side.

FIG. 1 shows a drawbar-guided low-lift industrial truck. Said industrial truck comprises a drive part 10 and a load part 12. The load part 12 has two fork arms 14, load wheels 16 being arranged on the front ends thereof and which may be swung out downwards. The fork arms 14 are able to be lifted relative to the drive part 10 and form a load carrying means.

The drive part 10 has a steerable drive wheel 18 which is controlled by a drawbar 20. On the drawbar head 22 a multifunction control unit is arranged with operating elements for the travel drive and lifting drive. The drive part 10 also comprises an electric motor and a gear mechanism for the travel drive, a lifting drive and corresponding control devices. These elements are not shown in the figures.

The drive part 10 has a particularly short construction, the length of the drive part 10 (without the drawbar 20) in the direction of travel being less than half the size of the width of the drive part 10 transversely to the direction of travel. This short construction is achieved by the use of an energy module 24 with a battery of high energy density, in particular in lithium-ion technology, which is incorporated in the drive part 10. It is located in an upper region of the drive part 10 and is visible from outside in the state shown in FIGS. 1 to 3 and fully inserted into a battery receiving space. A front side wall 26 of the energy module 24 facing a user who is located at the end of the drive part 10 on the drawbar side, as well as an upper surface 28 of the energy module are visible from outside and terminate approximately flush with adjacent outer surfaces of a housing of the drive part 10.

At the upper end of the energy module 24, a stirrup-shaped handle 30 is formed, which may be gripped easily from outside in the installed position shown of the energy module 24.

Figure 2:
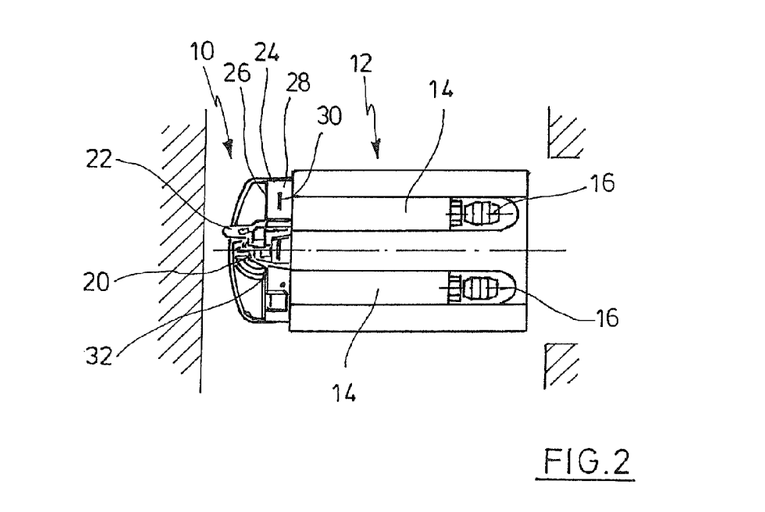
FIG. 2 shows the industrial truck of FIG. 1 in a view from above.

In the view of FIG. 2 from above, the aforementioned components are shown again. The short construction of the drive part 10 and the lateral arrangement of the energy module 24 are clearly visible. The energy module 24 is located to the side of a central bulged portion 32 of the housing of the drive part 10 facing the drawbar.

Figure 3:
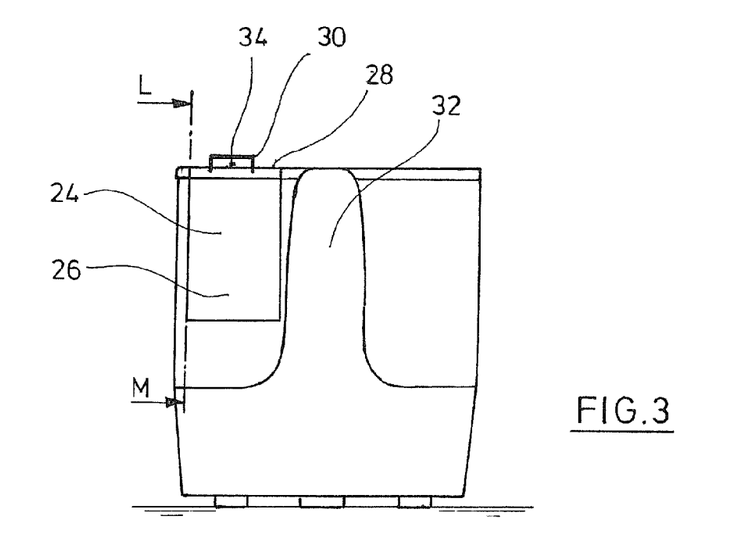
FIG. 3 shows a simplified view of the industrial truck of FIG. 1, of the side of the drive part facing the user.

This is also clearly visible in the simplified view of FIG. 3. Also visible is an actuation element 34 in the form of a push button for a locking device of the energy module 24. Relative to the longitudinal direction of the handle 30, the actuation element 34 is arranged in the centre thereof, so that when gripping the handle 30 it may be easily actuated, for example, by one finger of the hand gripping the handle 30.

The movement sequence to be performed for removing the energy module 24 from the battery receiving space of the industrial truck is illustrated in FIG. 1 by the arrow 36. In detail, this sequence and the cooperation with the battery receiving space is explained with reference to FIG. 4. Part a) of this figure shows the battery receiving space in a cross-sectional type view, in the viewing direction denoted in FIG. 3 by L-M. The battery receiving space has a horizontally arranged base 38, a rear wall 40 arranged vertically, an upper wall 42 and a front wall 44. The upper wall 42 is arranged horizontally and extends only over part of the width of the base 38 of the battery receiving space visible in FIG. 4. The upper wall 42 adjoins the rear wall 40. It is formed by a planar strip. At the end of the upper wall 42 remote from the rear wall 40 is located a horizontally arranged front edge 46 of the upper wall, to which at the top a vertically arranged bent-back portion 48 is adjoined. At the end of the base 38 remote from the rear wall 40, is located the front wall 44 which is inclined at a predetermined angle relative to the rear wall 40, so that the width of the battery receiving space, which is visible in the figure, starting from the base 38 upwards is increased.

Figure 4:
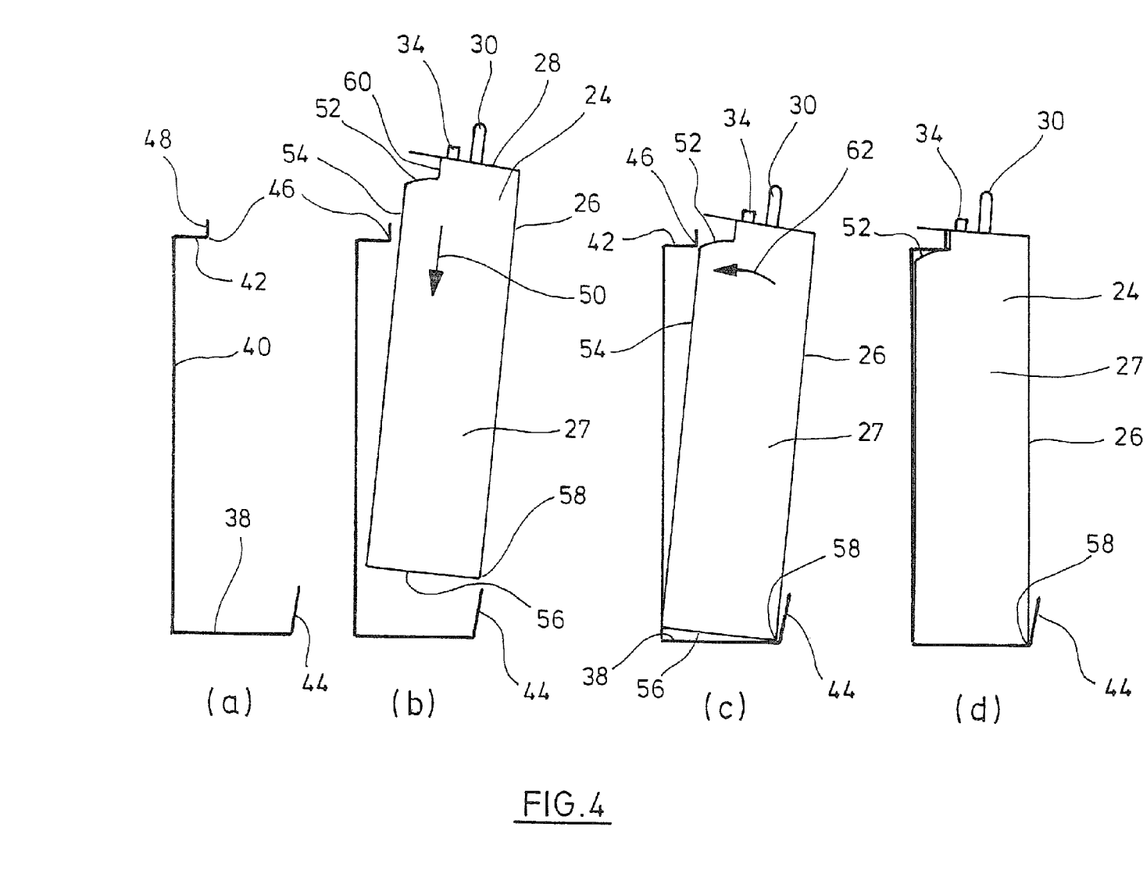
FIG. 4 shows the battery receiving space and an energy module in the view denoted in FIG. 3 by L-M in four different states a) to d)

In part b) of FIG. 4, in addition to the aforementioned parts of the battery receiving space, an energy module 24 is illustrated which is intended to be inserted into the battery receiving space. For example, it has been moved into the illustrated position in a lateral movement starting from the right in FIG. 4b). The energy module 24 has a front side surface 26, an upper top surface 28, a handle 30 and an actuation element 34. The handle 30 and actuation element 34 protrude upwards from the upper top surface 28. Furthermore, the side surfaces 27 of the energy module 24 have a curved upper contour 52. Between the two curved contours 52 extends a lower top surface 28.1 (see FIG. 5). This is not visible in FIG. 4, as it disappears behind the contour 52. A rear side surface 54 extends parallel to the front side surface 26 and downwards as far as a bottom surface 56. The radius of curvature of the curved upper contour 52 of the side surfaces 27 approximately corresponds to the distance of this contour 52 from the lower front edge 58 of the energy module 24. At the lower front edge 58, the front side surface 26 and the bottom surface 56 of the energy module adjoin one another. Further, the side surfaces 27 of the energy module 24 have a portion 60 arranged parallel to the rear side surface 54 and offset vertically inwards relative thereto at the upper end, the dimensions thereof corresponding to the bent-back portion 48 of the battery receiving space. In the position of the energy module shown in FIG. 4 b) the lower front edge 58 is located in the vicinity of an upper edge of the front wall 44, so that the lower front edge 58 when the energy module 24 is inserted further into the battery receiving space may slide in the direction of the arrow 50 along the inside of the front wall 44.

As a result, the energy module 24 reaches the defined intermediate position shown in part c) of FIG. 4, in which the lower front edge 58 rests against the base 38 of the battery receiving space, and namely in the vicinity of the front wall 44 adjacent to the base 38, and/or bearing thereagainst. At the same time, the edge formed between the curved contour 52 and the rear side wall 54 of the energy module 24 is located on the front edge 46 of the upper wall 42 of the battery receiving space. Starting from this intermediate position, the energy module 24 is tilted about the pivot axis formed by the lower front edge 58, as illustrated by the arrow 62. In this case, the curved upper contour 52 extends below the upper wall 42 of the battery receiving space. The front edge 46 of the upper wall thus is able to slide along the curved contour 52. In the end position shown in part d) of FIG. 4 which corresponds to the defined installed position, the front edge 46 of the front wall 42 of the battery receiving space bears against the curved contour 52 and prevents the energy module 24 from slipping upwards. The bent-back portion 48 may in this position bear against the vertical portion 60 of the energy module 24. The bottom surface 56 in the defined installed position preferably stands flat on the base 38 of the battery receiving space. The rear side surface 54 of the energy module 24 is adjacent to the rear wall 40 of the battery receiving space. The lower front edge 58 of the energy module 24 also bears against a surface of the battery receiving space, namely against the lower portion of the front wall 44. From the defined installed position shown in FIG. 4 d), the energy module 24 is only able to be removed from the battery receiving space after tilting the upper end of the energy module 24 by a predetermined angle about the pivot axis defined by the lower front edge 58.

Figure 5:
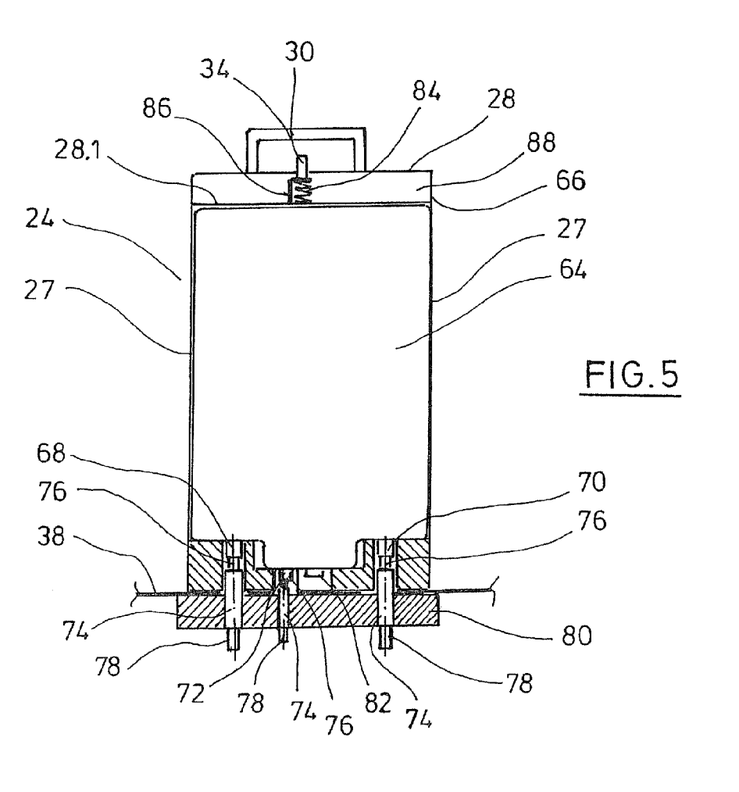
FIG. 5 shows a cross section through the energy module and parts of the battery receiving space in a vertical cutting plane.

FIG. 5 shows the energy module 24 in a cross-sectional view including the contact on the vehicle side. The energy module contains in the inside of its housing 66 a battery 64 with a plurality of lithium-ion cells, not-shown, and two contacts 68, 70. The battery 64 additionally contains a battery management system, also not shown, for monitoring the charged state of the battery 64 and for data exchange between the battery 64 and the vehicle control unit and/or charging unit. To this end, the battery 64 has further contacts 72, of which one is shown in the figure. Each of the contacts 68, 70, 72 cooperates with a resiliently pretensioned contact which, when inserting the energy module 24 into the battery receiving space in the defined installed position shown in FIG. 5, automatically produces an electrical connection. To this end, the resiliently pretensioned contacts have in each case a base body 74 and a contact body 76 longitudinally displaceably mounted therein. The contact bodies 76 are in each case acted upon by a spring, not shown, which is arranged inside the base body 74, with a spring force in the direction of the contacts 68, 70, 72 on the battery 64. At the lower ends of the base body 74 is located in each case a connection thread 78 for connecting to the electrical system of the vehicle. The base body 74 of the contacts are in each case fixedly embedded in an insulating base plate 80. The base 38 of the battery receiving space has openings through which the base bodies 74 of the contacts protrude, sufficient space remaining between the opening edges and base bodies 74 in order to exclude an electrical contact. Finally, the battery 64 has a multi-pole plug connection 82 which is intended for the connection of diagnostic equipment.

FIG. 5 also shows in the upper region the locking device 86 with the aforementioned actuation element 34. This is pretensioned by a spring 84 with a force counter to its actuation direction, i.e. upwards. The locking device 86 is located in a cavity 88 which is formed inside the housing 66 of the energy module 24 above the battery 64 between the lower top surface 28.1 and the upper top surface 28.

Figure 6:
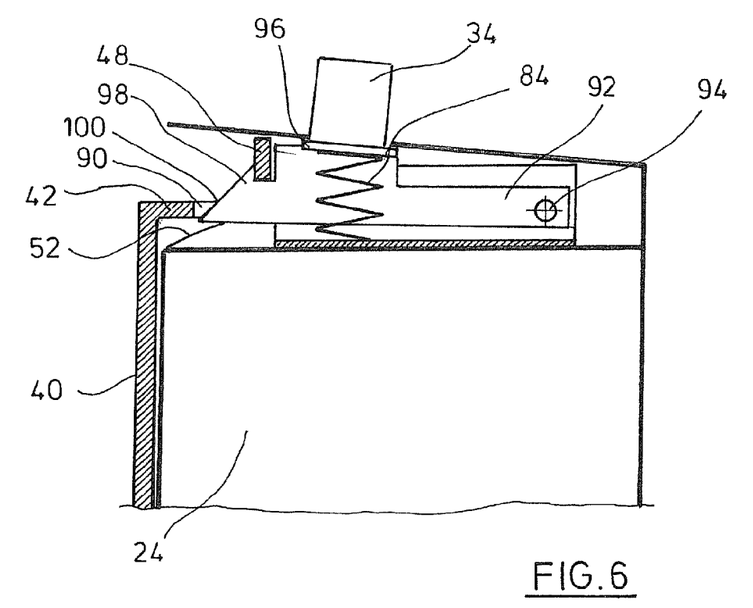
FIG. 6 shows the locking device of the energy module of FIG. 5 in a cross-sectional view.

FIG. 6 shows further details of the locking device 86. The already-described spring 84 and the actuation element 34 are visible. The energy module 24 is shown in its defined installed position, parts of the rear wall 40, parts of the upper wall 42 and the bent-back portion 48 of the battery receiving space being visible. The upper wall 42 has an opening 90. The locking device 86 comprises a hook 92 which is pivotably mounted about a horizontally arranged axis, around a bearing point 94. The spring 84 bears with its upper end on an approximately horizontally arranged portion 96 of the hook and presses the hook 92 upwards with the actuation element 34 fastened to the portion 96. The hook 92 has at its end shown to the left in the figure and remote from the bearing point 94, a latching portion 98 with a front face 100 inclined relative to the direction of movement of the upper end of the energy module 24 when tilted. The latching portion 98 in the defined installed position shown engages behind the bent-back portion 48 of the battery receiving space. This locking may be easily released by actuating the actuation element 34, by pressing downwards, and as a result pivoting the hook 92 about the bearing point 94 downwards. Then the upper end of the energy module 24 may be tilted to the right in the figure. The handle 30 of the energy module 24 is not shown in FIG. 6.

Figure 7:
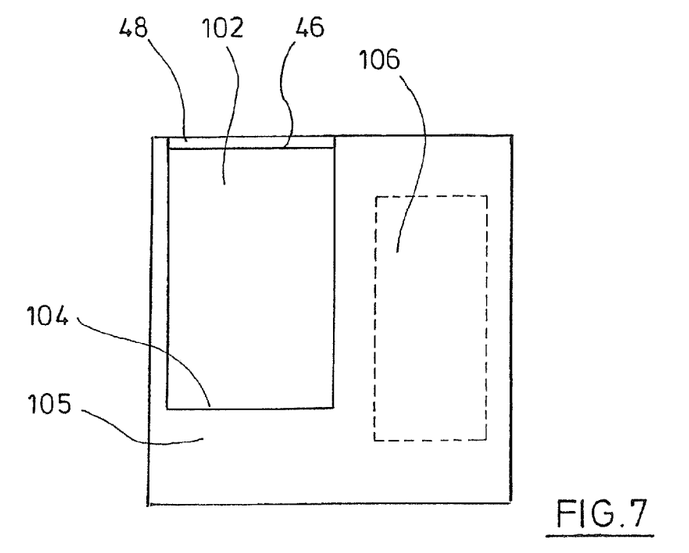
FIG. 7 shows a considerably simplified, schematic view of a charging station for an energy module.

FIG. 7 shows schematically and in a considerably simplified manner a charging station with a battery receiving space formed according to the battery receiving space of the aforementioned industrial truck, into which the energy module 24 may be inserted for recharging. To this end, the energy module 24 is inserted into an opening 102 of the battery receiving space. The opening 102 is defined downwards by an upper edge 104 of a front wall 105 and upwards by the front edge 46 of an upper wall 42, on which a bent-back portion 48 is adjoined at the top. A charging unit 106 of the charging station is shown in the vicinity of the opening 102 in dotted lines.

Figure 8:
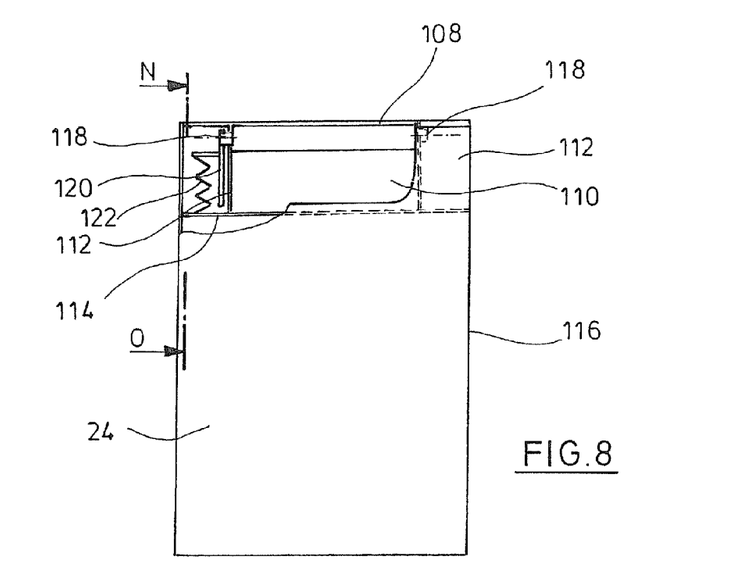
FIG. 8 shows a further exemplary embodiment of an energy module in a simplified view from the side.
Figure 9:
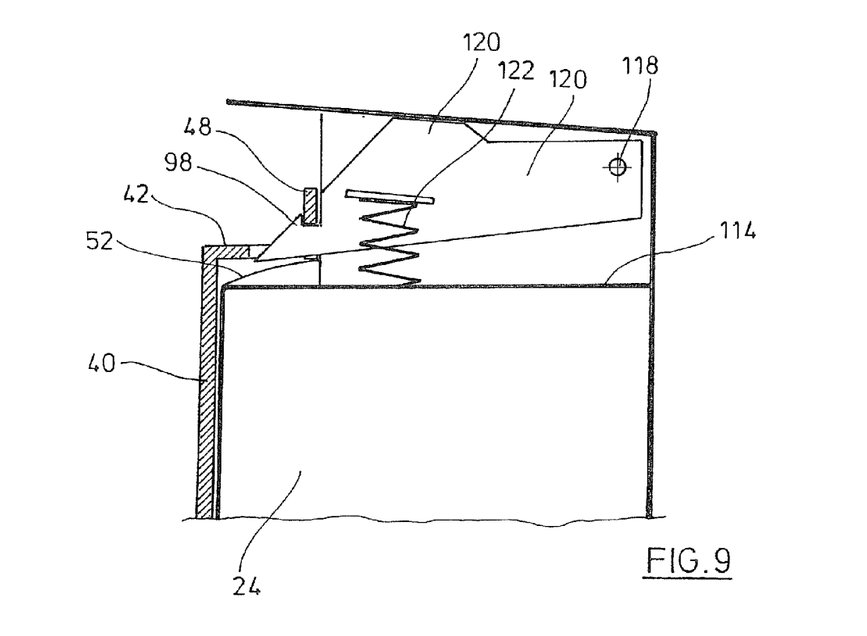
FIG. 9 shows a detailed view of the locking device of the energy module of FIG. 8 in the viewing direction denoted in FIG. 8 by N-O.

FIGS. 8 and 9 show a further exemplary embodiment of an energy module 24 in which a handle 108 is integrated in a contour of the housing 116, so that it does not protrude outwards. Below the handle is located a grip recess 110 so that the handle 108 may be easily encompassed by the hand. The grip recess 110 is defined by lateral partition walls 112 and a lower partition wall 114 which in each case form parts of the housing 116 of the energy module 24. The lower partition wall 114 corresponds to the lower top surface 28.1 of the exemplary embodiment of FIG. 5. The grip recess 110 is open at the top.

The handle 108 is configured as a rotary grip, and to this end has two pins 118 which are mounted in bores in the lateral partition walls 112. The pin 118 located to the left in FIG. 8 is connected fixedly in terms of rotation to a hook 120, which in turn is pressed upwards by a spring 122.

The mode of operation of the hook is shown in FIG. 9 again in a viewing direction which is denoted in FIG. 8 by N-O. The hook 120 has a latching portion 98 which as already explained in connection with the exemplary embodiment of FIG. 6 cooperates with the components of the battery receiving space also described there. The same reference numerals are used relative thereto in FIG. 9. The locking is released by rotating the rotary grip 108 anticlockwise, so that the energy module 24 may be removed from the battery receiving space in a single, fluent movement sequence.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A fork lift truck with a drive part (10) which comprises an electrical travel drive, a load part (12) which comprises a load carrying means comprising forwardly extending parallel fork arms, a battery receiving space and an energy module (24) which may be handled manually, which may be inserted into the battery receiving space and which comprises a battery (64) for supplying power to the travel drive, the energy module (24) having a defined installed position in the state inserted into the battery receiving space, characterized in that the battery receiving space encloses the energy module (24) in the inserted state so that the energy module (24) is not displaceable in the defined installed position but may only be removed from the battery receiving space after being tilted, during the tilting process an upper end of the energy module (24) being moved by a predetermined angle about a horizontal pivot axis.

2. A fork lift truck, comprising: a drive part (10) which comprises an electrical travel drive; a load part (12) which comprises forwardly extending parallel fork arms; a battery receiving space and an energy module (24) which may be handled manually, which may be inserted into the battery receiving space and which comprises a battery (64) for supplying power to the travel drive, the energy module (24) having a defined installed position in the state inserted into the battery receiving space, wherein the battery receiving space encloses the energy module (24) in the inserted state so that the energy module (24) is not displaceable in the defined installed position but may only be removed from the battery receiving space after being tilted, during the tilting process an upper end of the energy module (24) being moved by a predetermined angle about a horizontal pivot axis.

3. Industrial truck according to claim 1, characterized in that the energy module (24) has a housing (116) and the handle (108) is integrated in a contour of the housing (116) so that it does not protrude outwards over the housing (116).

4. Industrial truck according claim 1, characterized in that the battery receiving space has a base (38), a rear wall (40), two side walls and an upper wall (42), the energy module (24) in the defined installed position standing on the base (38) and having a curved upper contour (52) which is in contact with the upper wall (42).

5. Industrial truck according to claim 1, characterized in that the battery receiving space has a stop which cooperates with a mating piece on the energy module (24) and limits the tilting movement when the predetermined angle is reached.

6. Industrial truck according to claim 1, characterized in that the battery receiving space is integrated in the drive part (10).

7. Industrial truck according to claim 1, characterized in that at least one side surface (26) of the energy module and/or an upper surface (28) of the energy module (24) in the defined installed position is visible from outside and terminates substantially flush with an adjacent outer surface of a housing of the industrial truck.

8. Industrial truck according to claim 1, characterized in that during operation the industrial truck has a surface facing an operator, which is adjacent to the battery receiving space, and the energy module (24) is tilted in the direction of the operator.

9. Industrial truck according to claim 1, characterized in that a locking device (86) is provided which prevents the tilting of the energy module (24).

10. Industrial truck according to claim 9, characterized in that the locking device (86) has an actuation element (34) which is arranged so that it may be actuated by the hand gripping the handle (30) when the handle (30) is gripped.

11. Industrial truck according to claim 1, characterized in that resiliently pretensioned contacts are arranged on the energy module (24) or in the battery receiving space and which, when inserting the energy module (24), automatically produce an electrical connection between the energy module (24) and the industrial truck.

12. Industrial truck according to claim 1, characterized in that the energy module (24) has a battery management system and for producing an electrical connection for data exchange between the battery management system and the industrial truck further resiliently pretensioned contacts are arranged on the energy module (24) or in the battery receiving space which, when inserting the energy module (24), automatically produce an electrical connection between the energy module (24) and the industrial truck.

13. Industrial truck according to claim 1, characterized in that a charging station is present which has a battery receiving space which is the same as the battery receiving space of the industrial truck.

14. An industrial truck, comprising:
a drive part (10) which comprises an electrical travel drive;
a load part (12) which comprises fork arms;
a battery receiving space and an energy module (24) which may be handled manually, which may be inserted into the battery receiving space and which comprises a battery (64) for supplying power to the travel drive, the energy module (24) having a defined installed position in the state inserted into the battery receiving space,
wherein the battery receiving space encloses the energy module (24) in the inserted state so that the energy module (24) is not displaceable in the defined installed position but may only be removed from the battery receiving space after being tilted, during the tilting process an upper end of the energy module (24) being moved by a predetermined angle about a horizontal pivot axis.

* * * * *